United States Patent

[11] 3,566,974

[72] Inventor Arnold F. Kopaska
 Guthrie Center, Iowa 50115
[21] Appl. No. 777,293
[22] Filed Nov. 20, 1968
[45] Patented Mar. 2, 1971

[54] PLOW MULCHER
 18 Claims, 11 Drawing Figs.
[52] U.S. Cl.............................................. 172/202,
 172/491, 172/499, 172/500, 172/502, 172/643,
 172/710
[51] Int. Cl....................................... A01b 49/02
[50] Field of Search.......................... 172/199-
 —203, 264, 265, 278, 459, 462, 466, 482, 488,
 497, 500, 501, 491, 643, 662, 705—707, 741, 744,
 758, 759, 710; 37/8

[56] References Cited
 UNITED STATES PATENTS

| | | | | |
|---|---|---|---|---|
| 355,292 | 1/1887 | Baker | | 172/202 |
| 935,417 | 9/1909 | Seitner | | 172/202 |
| 949,039 | 2/1910 | Luce | | 172/202 |
| 968,072 | 8/1910 | Ogle | | 172/203 |
| 1,213,553 | 1/1917 | Swainson | | 172/202X |
| 1,581,395 | 4/1926 | Danskin | | 172/710X |
| 2,626,553 | 1/1953 | Newlin | | 172/502X |
| 2,736,252 | 2/1956 | Latshaw | | 172/643 |
| 2,741,043 | 4/1956 | Lindbeck | | 172/500X |
| 2,918,979 | 12/1959 | Graham | | 172/482X |
| 2,934,155 | 4/1960 | McMaster | | 172/643X |
| 2,960,169 | 11/1960 | Collins | | 172/744X |
| 3,021,908 | 2/1962 | Dlugosch | | 172/466 |
| 3,100,018 | 8/1963 | Sokolowski | | 172/705X |
| 3,210,869 | 10/1965 | Hein | | 37/8 |

FOREIGN PATENTS

| 478,621 | 2/1953 | Italy | 172/202 |
|---|---|---|---|

Primary Examiner—Robert E. Bagwill
Assistant Examiner—Alan E. Kopecki
Attorney—Zarley, McKee and Thomte ABSTRACT: A plow having a pivotally mounted plow mulcher connected to the plow frame through hinged arms. A plow mulcher frame is carried on the outer ends of the hinged arm and may be moved between raised and lowered positions by operation of an overcenter spring arrangement, hydraulic cylinder and cable arrangement, or a hydraulic cylinder extending between the plow frame and the outer hinged arm portion. A cushioning spring may be provided for the hydraulic cylinder to yieldably permit raising of the mulcher frame without contracting the hydraulic cylinder. The mulcher and the plow may be operated from a common hydraulic power source through separate hydraulic cylinders connected together such that the mulcher is raised and lowered first due to its lower power requirements. Unlimited adjustability is provided in the mulcher structure to position the mulcher as desired relative to the plow.

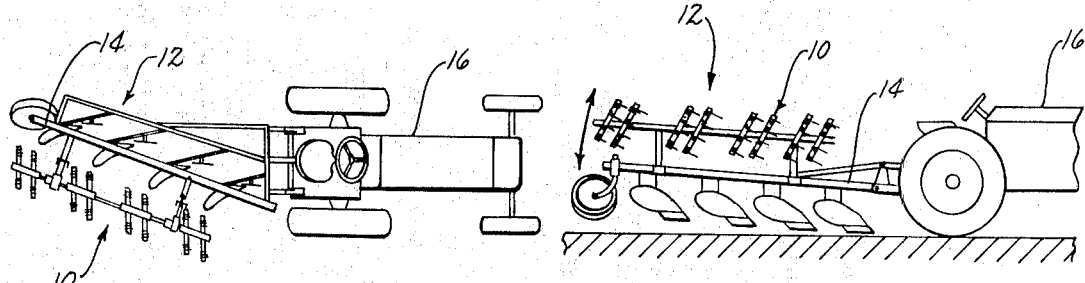
Fig. 1    Fig. 2
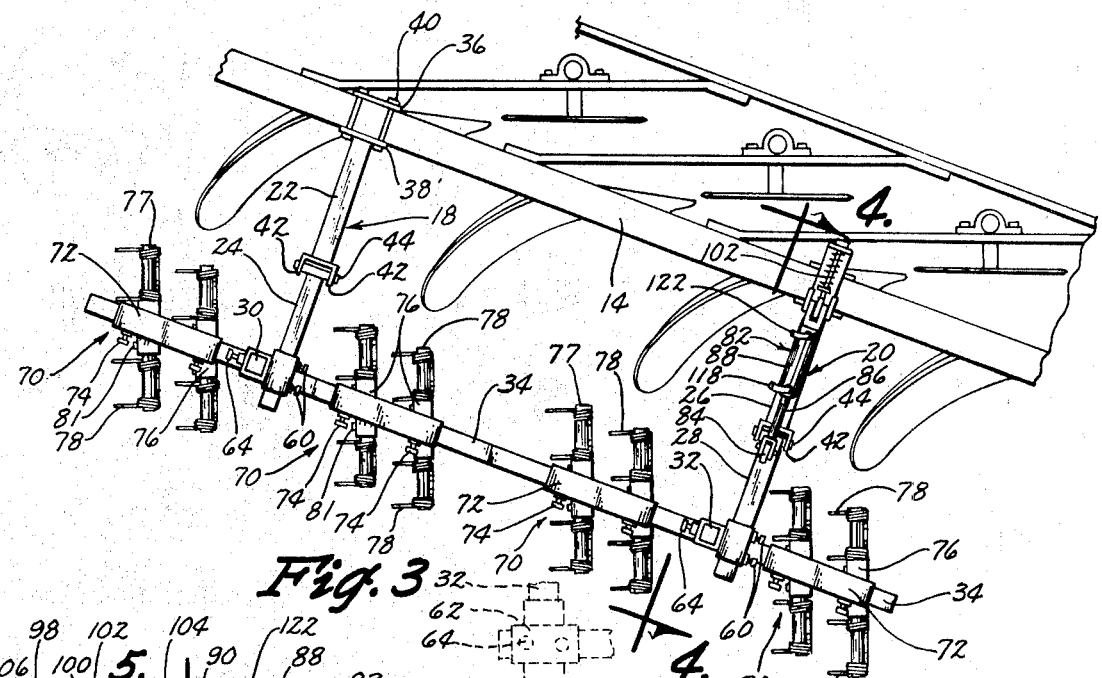
Fig. 3
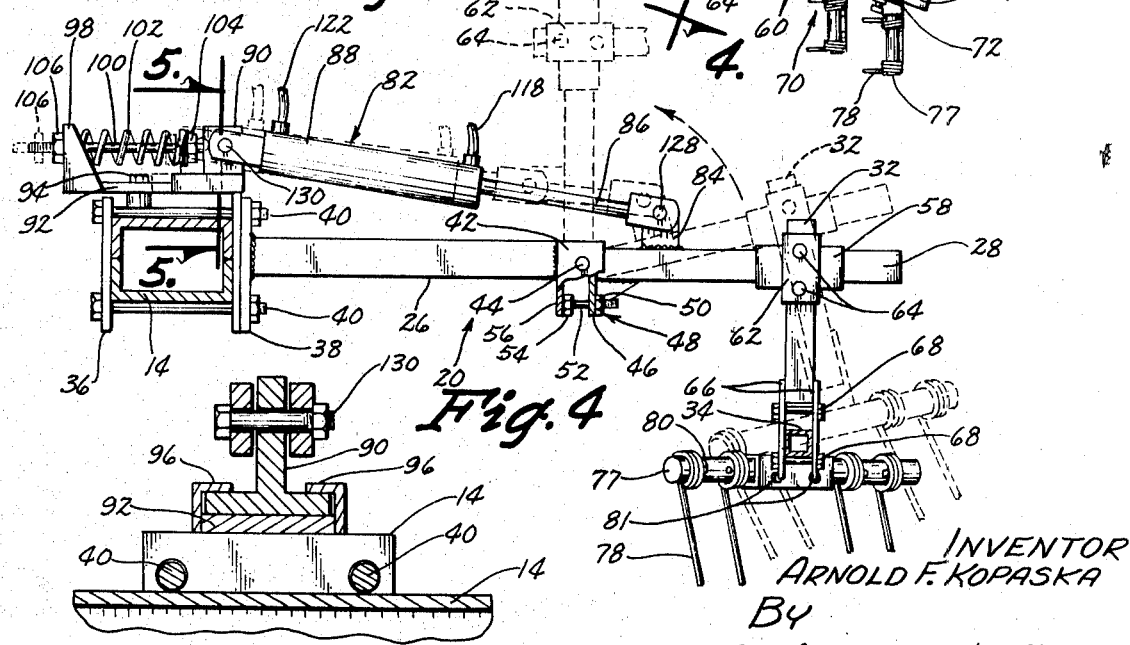
Fig. 4
Fig. 5
INVENTOR
ARNOLD F. KOPASKA
BY
Zarley, McKee Thomte
ATTORNEYS

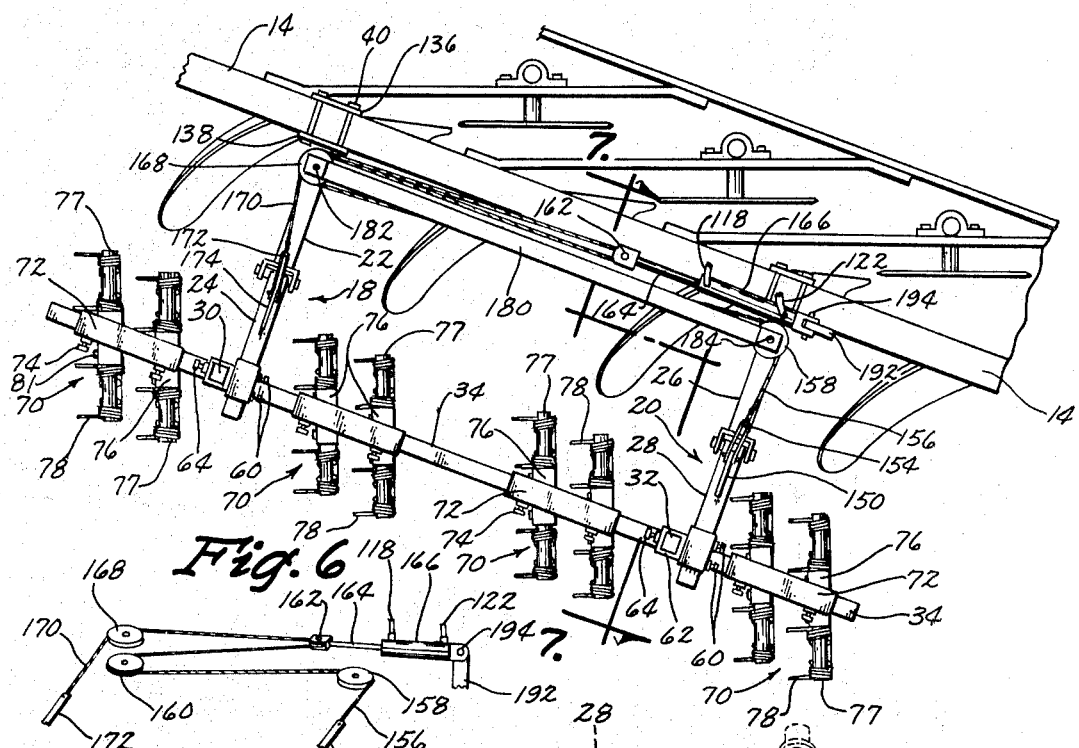
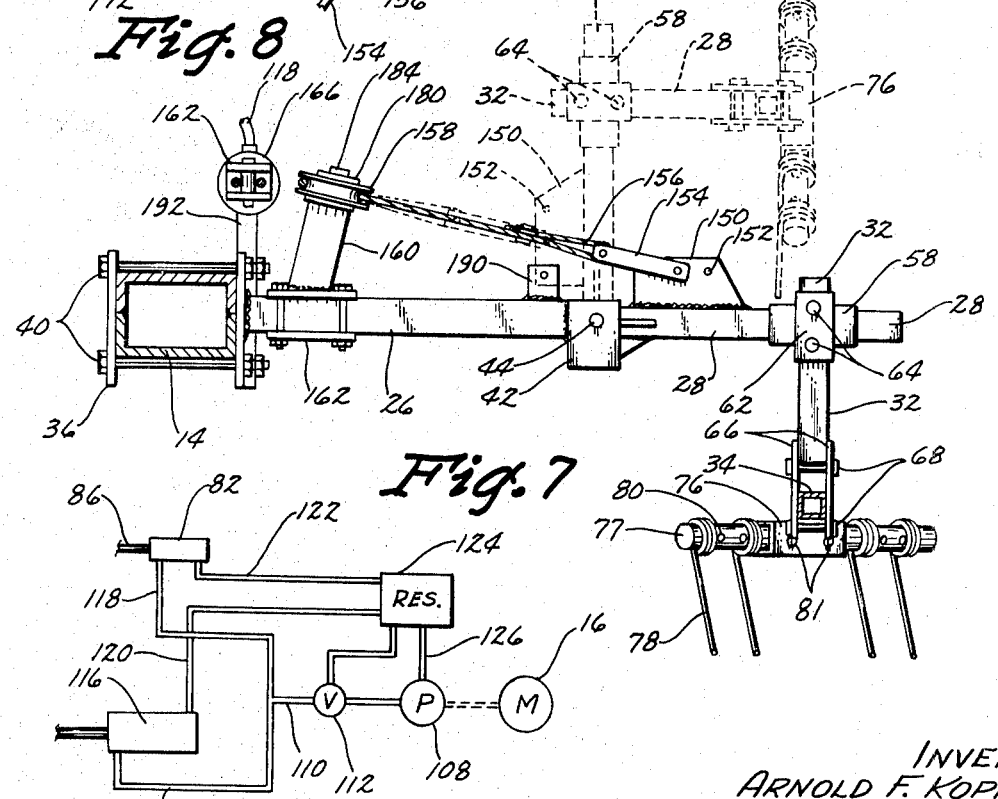
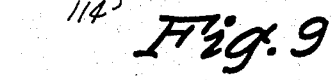

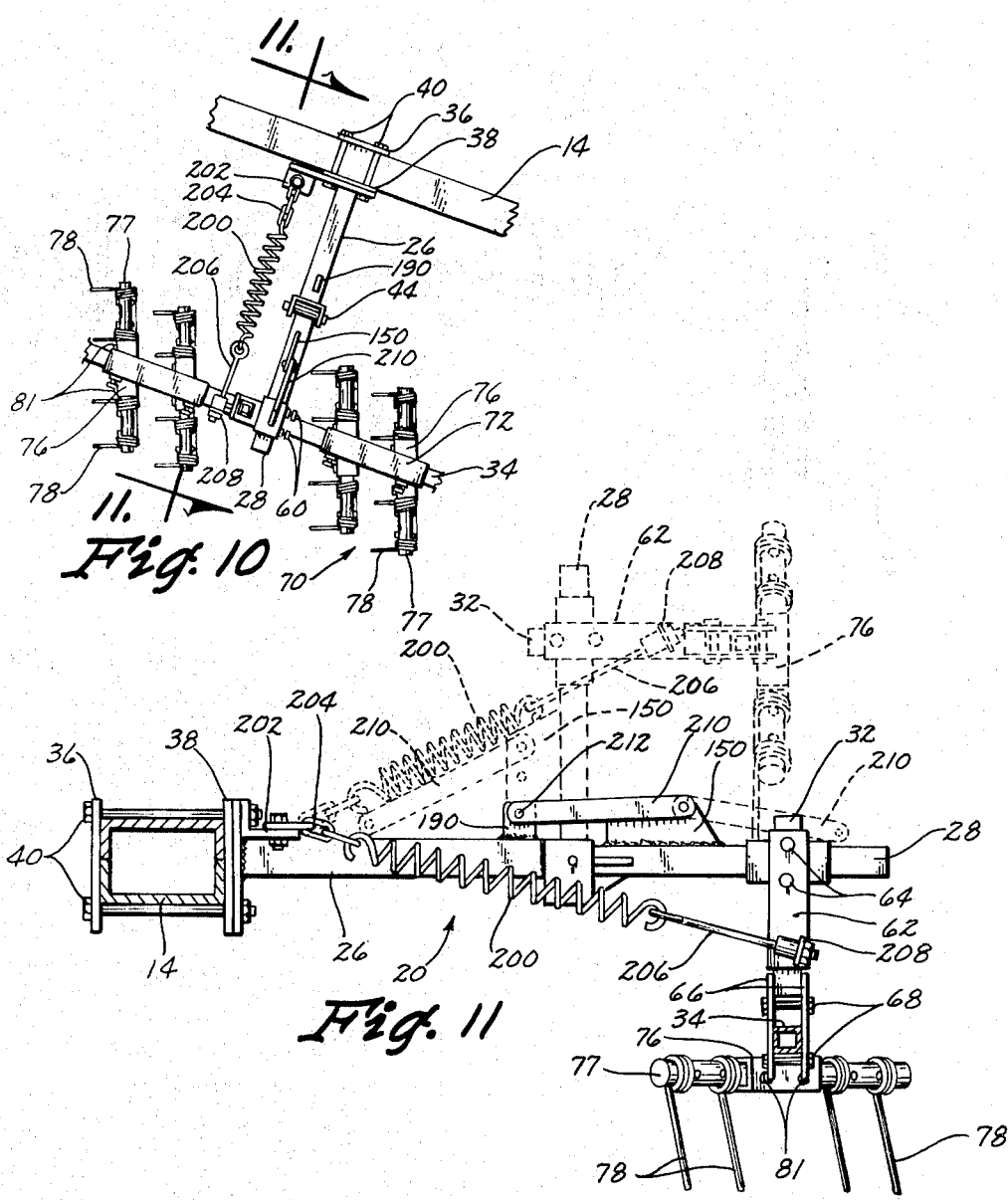

PLOW MULCHER

The plow mulcher of this invention provides a universal mulcher structure for mounting on any standard plow. It particularly is mounted on a moldboard-type plow having an elongated frame member such that the mulcher unit has a single elongated frame member in parallel relationship to the plow elongated frame member. Transversely extending ground-working units are mounted on the mulcher frame intermediate their ends and pivot to a collapsed position when raised to minimize the width of the plow and mulcher when in transport. Post members extend between the mulcher frame and the outer end portions of the mulcher arms and the connections therebetween are such that the mulcher frame may be moved along the length of the mulcher arms and perpendicularly towards and away from the mulcher arms. The mulcher frame may be pivoted relative to the horizontal at its connections with the posts connecting it to the mulcher arms. The teeth units mounted on the mulcher frame may be slidably adjustable along the length thereof and the transverse members on which the teeth are mounted may be slidably positioned transversely of the teeth units and the mulcher frame. The teeth elements are rotatably mounted on the transversely extending shafts of the teeth units.

The mulcher frame may be lowered and raised manually with assistance of an over-the-center spring operative to hold the frame in a downward position or a raised position. Positive lock means is also provided to hold the mulcher unit in a raised or lowered position. Alternatively, a hydraulic cylinder and cable arrangement may be employed for raising and lowering the mulcher unit. Also a hydraulic cylinder may be connected between the outer arm portion and the plow frame for raising and lowering the mulcher unit, the hydraulic cylinder being yieldable in response to the mulcher hitting an obstruction by virtue of a spring means being positioned between the cylinder and the plow.

These and other features and advantages of this invention will become readily apparent to those skilled in the art upon reference to the following description when taken into consideration with the accompanying drawings, wherein:

FIG. 1 is a top plan view of a tractor pulling a moldboard-type plow having a mulcher unit mounted thereon;

FIG. 2 is a side elevation view of the mulcher unit in a raised position with the teeth units pivoted forwardly thereby minimizing the width of the plow and mulcher unit;

FIG. 3 is a fragmentary enlarged top plan view of the plow and mulcher unit;

FIG. 4 is a cross-sectional view taken along line 4—4 in FIG. 3;

FIG. 5 is a cross-sectional view taken along line 5—5 in FIG. 4;

FIG. 6 is a fragmentary top plan view similar to FIG. 3 but showing an alternate lifting arrangement for the mulcher unit;

FIG. 7 is a cross-sectional view taken along line 7—7 in FIG. 6;

FIG. 8 is a schematic illustration of the hydraulic cylinder and cable power means;

FIG. 9 is a schematic of the hydraulic circuitry for the plow and mulcher hydraulic cylinders;

FIG. 10 is a fragmentary top plan view of a third embodiment of the lift means for the mulcher unit; and FIG. 11 is a side elevation view taken along line 11—11 in FIG. 10.

The plow mulcher unit of this invention is referred to generally in FIG. 1 by the reference numeral 10 and is shown mounted on a moldboard-type plow 12 having an elongated frame 14 extending the length thereof. The plow is being pulled by a tractor 16. The mulcher 10 illustrated in FIGS. 1—5 includes a pair of arms 18 and 20 having inner and outer hinged portions 22, 24 and 26, 28. The outer arm portions 24 and 28 are connected through posts 30 and 32 to an elongated mulcher beam or frame member 34 which is disposed generally in parallel relationship to the plow frame member 14 as seen in FIG. 3. As also seen in FIG. 3, conventional plow frame 14 is disposed at an angle relative to the line of travel of the plow 12. The arms 18 and 20 are substantially perpendicular to both the plow frame 12 and the mulcher beam 34. As further seen in FIG. 3, the longitudinal axes of sleeves 76 of ground engaging units 70 (to be discussed hereafter) are substantially perpendicular to the line of travel of the plow unit 12, which is on a horizontal line to the right as seen in this FIG.

The inner arm portion 26 is rigidly secured to the plow frame by a pair of clamping plates 36 and 38 interconnected by bolts 40. The inner arm portion 26 includes a pair of spaced-apart flanges 42 on its outer end between which the inner end of the outer arm portion 28 is received and pivotally interconnected by a pin 44. A downwardly extending flange 46 is formed on the inner end of the outer arm portion 28 and carries an adjustable stop bolt 48 for engagement with the outer end of the inner arm portion 26 as seen in FIG. 4. The stop bolt 48 includes a nut 50 welded to the flange 46 and a bolt 52 having a head 54 for engagement with a flange 56 extending between the clevis plates 42 and below the pivot pin 44.

The outer arm portion 28 is rectangular in cross section and carries a slidable sleeve 58 adjustably held in position by setscrewlike lock bolts 60. A perpendicularly arranged sleeve 62 is welded to the side of the sleeve 58 and slidably receives the posts 30 and 32. Adjustable set lock bolts 64 are provided for locking the posts 30 and 32 in place. The lower end of the posts 30 and 32 include squeeze-type clamping plates 66 which embrace the mulcher frame 34. It is noted that the height of the opening through which the frame 34 extends between the plates 66 is sufficient to permit vertical adjustment as seen in FIG. 4. A pair of bolts 68 provide the locking action required for the clamping plates 66.

A series of teeth units 70 are carried on the frame 34 and each include a slidable sleeve 72 adjustably locked in place by set lock bolts 74. Each sleeve 72 includes a pair of transversely extending sleeves 76 welded on the lower side thereof and holding a shaft 77 on which spring teeth 78 are mounted for working the ground. The spring teeth 78 are freely pivotal on the shafts 76 until they engage stop pins 80. Set bolts 81 permit selective rotation of the shafts 76 in the sleeves 76.

A hydraulic cylinder unit 82 is provided for raising and lowering the mulcher unit between the solid and dash line positions of FIG. 4. An upstanding ear 84 is formed on the outer arm portion 28 for engagement with the outer end of the piston rod 86 while the cylinder end 88 of the cylinder unit 82 is connected to a slidable bracket 90 mounted on a support plate 92 bolted to the plow frame 14 by a bolt 94. As seen in FIG. 5 inwardly extending guide flanges 96 are provided for holding the bracket 90 in a track. The support plate 92 has an upstanding stop member 98 opposite the bracket 90. A bolt 100 extends through the stop plate 98 and through a coil spring 102 positioned between the bracket 90 and the stop plate 98 and is secured to the bracket 90. An adjustable nut 104 is provided on the bolt adjacent the bracket 90 to vary the pressure on the spring 102. Additional adjustment may be obtained by adjusting the nut 106 on the end of the bolt 100 adjacent the stop plate 98.

In FIG. 9 the hydraulic circuitry for operating the cylinder unit 82 is illustrated. The power supply of the tractor 16 is employed to drive a hydraulic pump 108 having a line 110 extending through a relief valve 112 for communication with the inlet line 114 of the plow lift cylinder 116 and the inlet line 118 of the mulcher lift cylinder 82. The outlet line 120 of the plow cylinder and the outlet line 122 of the mulcher cylinder 82 are in communication with a reservoir 124 which in turn feeds the pump 108 through a line 126.

The operation of the mulcher unit of FIGS. 1—5 is simple and quick. The unit is easily clamped to a conventional plow frame 14 through use of the clamping plates 36 and 38 on the ends of the arms 18 and 20. The mulcher frame 34 may be positioned in an infinite number of positions through use of the adjustment features provided which include longitudinal movement along the outer arm portion 28 by sliding the sleeve 58, vertical adjustment of the post 32 by sliding the post 32 in the sleeve 62, and longitudinal adjustment of the teeth units 70 along the mulcher frame 34 by sliding the sleeves 72 therealong. Furthermore, the teeth shafts 77 may be rotated within the sleeves 76 as necessary while the teeth 78 are free to pivot against stop pins 80 on the shaft 77. The cylinder unit 82 is quickly attached and detached through pins 128 and 130. The spring support plate is easily connected to the plow frame 14 by the bolt 94 or other appropriate connecting means. While separate power supplies may be used to operate the plow-lifting mechanism and the cylinder 82 for the mulcher a common pump 108 is shown in FIG. 9. The pump 108 when actuated will tend to actuate the cylinder 82 first since it offers the least resistance to the flow of hydraulic fluid as compared to the plow cylinder unit 116 which is secured in conventional fashion to the plow frame 14. Accordingly, when the plow is raised out of the ground the mulcher unit will always be raised first. When the mulcher unit is lowered and the length of the cylinder unit 82 is fixed the arms 18 and 20 cannot pivot in response to the hitting of an obstruction except for the fact that the inner end of the cylinder unit 82 is connected to the coil spring 102 which permits the entire cylinder unit 82 to move to the left to the dash line position shown in FIG. 4. This dampening action serves as a positive safeguard against damaging the mulcher or plow.

It is further seen that the stop bolt 48 in FIG. 4 prevents the arm 20 from pivoting to an overcenter position which would render the cylinder unit 82 inoperative. Adjustment of this bolt may be made as desired to further limit the downward pivotal movement of the outer arm portion 28 and thus further assist in adjustment of the ground working in the direction of the mulcher unit. It is thus seen that the lifting mechanism occupies a minimum of space for the mulcher unit and is positioned entirely on one arm and is substantially trouble free in operation.

An alternate lifting arrangement is illustrated in FIGS. 6, 7 and 8 and like numerals will be used to describe like parts. The outer arm portion 28 includes an upstanding plate member 150 having a series of spaced apart holes 152 formed therein for selective engagement with a link member 154 connected to a cable 156 extending around a sheave 158 mounted on a post 160 rigidly connected to a clamping bracket 162 secured to the inner arm portion 26 adjacent the plow frame 14. As seen in FIG. 6 the cable end portion 156 extends rearwardly along the plow frame 14 and around a sheave 160 thence back to a sheave 162 carried on the piston rod 164 of a lift cylinder unit 166 mounted on the plow frame 14. The cable then extends toward the arm 18 and around a sheave 168 where a cable portion 170 terminates in engagement with a link plate 172 pivotally connected to an upstanding plate 174 mounted on the top side of the outer arm portion 24. To further stabilize the sheaves 158, 160 and 168, a longitudinally extending member 180 is provided which extends along the frame 14 of the plow and engages the upper ends of the sheave pins 182 and 184. It is appreciated that the sheaves 160 and 168 are mounted on the common sheave pin 182.

An upstanding plate element 190 is provided on the inner arm portion 26 and is positioned to be placed in alignment with an opening 152 in the upstanding plate 150 to hold the mulcher unit in a raised position if desired as illustrated by the dash lines in FIG. 7. Thus when a pin is inserted through the plates 190 and 150, the unit is locked in an up position and the load is removed from the cylinder unit 166.

The cylinder unit 166 in operation may correspond to the cylinder unit 82 of FIG. 9. The mulcher unit will move to its lowered position by gravity while being raised to its up position by contraction of the cylinder unit 166. Thus it is seen that the cylinder unit 166 is easily mounted on the plow frame 14 through its connection to an upstanding post 192 and thus a pin 194 is all that is required to remove the cylinder. The contraction of the cylinder by pumping fluid through the line 118 into the double-acting piston cylinder of the cylinder unit 166 results in placing the cable portions 156 and 170 in tension and pivoting the outer arm portions 20 and 24 upwardly to raise the mulcher unit to the dash line position of FIG. 7. The mulcher unit is lowered by simply expanding the cylinder 166 and allowing gravity to pivot the mulcher unit downwardly to the desired height.

The mulcher unit of FIGS. 10 and 11 does not include any hydraulic power unit and accordingly is manually operated with the assistance of a tension coil spring 200 connected at one end through a bracket 202 bolted to the inner end of the inner arm portion 26 by a bolt 40 clamping the arm 20 to the plow frame 14. A length of chain 204 is provided between the bracket 202 and the spring 200 to give the connection flexibility in length and permit it to bend as desired. An eye bolt 206 is provided on the outer end of the spring 200 and is connected to the sleeve 62 through a bracket 208. This connection is below the horizontal plane of the arm 20.

The outer arm portion 28 includes the upstanding plate 150 and the inner arm portion 26 includes an upstanding element 190 which may be locked together by a link 210 as shown in the solid line position of FIG. 11 to maintain the mulcher unit in a down position. To unlock the unit a pin 212 need only be removed and the link 210 pivoted back out of the way to the dash line position. The unit is then pivoted upwardly such that an opening 152 in the plate 150 is in alignment with the opening in the upstanding plate 190 and the unit is then locked in an up position by the pin 212.

It is seen that the spring 200 is positioned in such a manner that it serves to hold the outer arm portion 28 in a downwardly pivoted position and once the mulcher unit is raised to an overcenter position the spring 200 tends to pull it upwardly to the dash line raised position of FIG. 11. Thus the spring 200 to serves to hold the unit down as well as to hold it up by the overcenter operation thereof.

The location of the pivotal axis of the outer arm portion 28 inwardly of the mulcher frame 34 is important for holding the mulcher units 70 in engagement with the ground. This extended lever arm for pivotal movement tends to dampen and minimize any tendency for the mulcher unit to raise out of the ground upon hitting obstructions or the like.

Thus it is seen that the mulcher unit of this invention may be operated between raised and lowered positions in several different ways including mounting a cylinder unit directly on one of the arms as shown in FIGS. 1—5 or using a cable arrangement and mounting the lift cylinder on the plow frame as shown in FIGS. 6—7. Alternatively, the unit may be operated manually by the assistance of a spring as shown in FIGS. 10 and 11 wherein the spring tends to help raise the mulcher and also help to maintain it in a ground-working lowered position.

Some changes may be made in the construction and arrangement of my plow mulcher without departing from the real spirit and purpose of my invention, and it is my intention to cover by my claims, any modified forms of structure or use of mechanical equivalents which may be reasonably included within their scope.

I claim:

1. In combination:
   a plow unit having an elongated straight frame member disposed at an angle other than a right angle with respect to the normal direction of travel of said plow unit doing the plowing operation;
   a plurality of plow elements secured to said elongated frame member and adapted to normally throw soil outwardly in a transverse direction with respect to said elongated frame member during the plowing operation;
   a pair of elongated mulcher support arms rigidly connected to said elongated frame member and extending substantially perpendicularly and transversely outwardly therefrom;
   said pair of mulcher support arms including hinged-together portions for the outer portion to be pivoted between lowered and raised positions;
   an elongated beam connected to the outer portions of said pair of support arms;

said beam being substantially parallel to said elongated frame member;

ground working teeth units connected to said elongated beam, and comprising a vertical support means, a substantially horizontal member secured to the lower end of said support means, teeth elements on said horizontal member, and the longitudinal axes of said teeth members being substantially perpendicular to the normal direction of travel of said plow unit during the plowing operation; said teeth units being positioned closely adjacent the outward edges of said plow elements to work the soil as it is being moved outwardly by said plow elements; and control means operatively connected between the frame member and said outer portion for pivoting the hinged together portions of said mulcher support arms.

2. The structure of claim 1 wherein said beam is connected to said outer portions of said support arms by posts extending substantially perpendicularly to said outer portions and said elongated mulcher frame.

3. The structure of claim 2 wherein said posts are selectively adjustable transversely and longitudinally of said outer portions of said support arms.

4. The structure of claim 3 wherein said ground working teeth units are selectively adjustable longitudinally of the elongated beam.

5. The structure of claim 4 wherein said elongated beam is adjustable longitudinally of said posts for providing the desired angular relationship of said elongated frame member relative to the ground.

6. The structure of claim 1 wherein a spring in tension extends between said frame member and one of said posts, said spring being positioned for overcenter operation to hold said outer arm portion in a lowered position and at other times hold it in a raised position.

7. The structure of claim 1 wherein cooperating means are provided on said arm portions for locking said outer portion in said raised and lowered positions.

8. The structure of claim 1 wherein said control means is a hydraulic cylinder means connected between said frame member and one of said support arms.

9. The structure of claim 8 wherein said hydraulic cylinder means includes a hydraulic cylinder connected to a cable having its opposite ends anchored on the outer portions of said arms for said outer portions of the arms to be raised and lowered as said cylinder is contracted and expanded respectively.

10. The structure of claim 9 wherein said hydraulic cylinder is arranged in parallel relationship to the longitudinal frame member, cable sheaves being positioned on each of said inner arm portions and a third cable sheave being positioned adjacent said sheave on one of said inner arm portions and remotely of said hydraulic cylinder, said cable extending from one end anchored to said outer arm portion connected to said one inner arm portion over said sheave on said one inner arm portion, over a sheave on the outer end of the piston rod of said hydraulic cylinder, around the third sheave and finally over said sheave on the other inner arm portion to the point it is anchored on said other outer arm portion.

11. The structure of claim 10 wherein each of said sheaves on said inner arm portions are mounted on riser posts above the inner arm portions.

12. The structure of claim 8 wherein said hydraulic means includes a hydraulic cylinder anchored at one end to said elongated plow frame and at the other end to the outer arm portion of one of said arms whereby expansion of said cylinder will lower said outer arm portion and contraction of said cylinder will raise said outer arm portion.

13. The structure of claim 12 wherein said cylinder includes spring means in its connections at one of its ends to permit movement of said cylinder independently of contraction and expansion of said cylinder whereby said outer arm portion may be yieldably held in a lowered position, and means on said frame member to retain and connect said spring to said cylinder.

14. The structure of claim 13 wherein said spring means is connected between the inner end of said cylinder and said elongated plow frame.

15. The structure of claim 14 wherein said spring means includes a slidable bracket connected to the inner end of said cylinder and engaging one end of a spring element and a stop element on said bracket provided for engagement with the opposite end of said spring element.

16. The structure of claim 15 wherein said spring means includes a bolt member slidably extending through said stop element and along the length of said spring element to engagement with said slidable bracket.

17. The structure of claim 13 wherein a stop means is provided between said inner and outer arm portions to limit downward pivotal movement of said outer arm portion against movement to an overcenter position relative to the position and action of said cylinder.

18. The structure of claim 13 wherein said hydraulic means includes a second cylinder connected to said frame member for raising and lowering said plow unit and said cylinders are connected to a common power source such that said beam connected to said outer arm portion will be operated first in raising and lowering operations for reason of its operative load requirements for operation being lower than said plow.